United States Patent [19]

Hatori et al.

[11] Patent Number: 5,138,482
[45] Date of Patent: Aug. 11, 1992

[54] LIGHT MODULAR AND RECORDING DEVICE EMPLOYING SAME

[75] Inventors: Masami Hatori; Hiroshi Sunagawa, both of Kanagawa, Japan

[73] Assignee: Fuji Photo Film Co., Ltd., Kanagawa, Japan

[21] Appl. No.: 588,122

[22] Filed: Sep. 25, 1990

[30] Foreign Application Priority Data

Sep. 25, 1989 [JP] Japan .................................. 1-248489
Oct. 13, 1989 [JP] Japan .................................. 1-267664
Apr. 18, 1990 [JP] Japan .................................. 2-102020

[51] Int. Cl.$^5$ ........................ G02F 1/33; G02F 1/335; H04N 9/14
[52] U.S. Cl. .................................. 359/305; 359/312; 359/311; 385/7; 358/63; 358/201
[58] Field of Search ............................ 350/96.13, 358; 359/311, 312, 305, 239; 385/7, 8; 358/63, 201

[56] References Cited

U.S. PATENT DOCUMENTS

| | | | |
|---|---|---|---|
| 4,470,661 | 9/1984 | Matsumoto | 385/7 |
| 4,595,253 | 6/1986 | Yamashita et al. | 350/358 |
| 4,929,044 | 5/1990 | Arimoto et al. | 350/96.13 |
| 4,992,858 | 2/1991 | Kobayashi | 358/63 |

FOREIGN PATENT DOCUMENTS

| | | | |
|---|---|---|---|
| 0192232 | 10/1984 | Japan | 350/96.13 |
| 0156224 | 7/1986 | Japan | 350/358 |

OTHER PUBLICATIONS

Integrated Optics; T. Tamir, 1975 Table of Contents, pp. 13-31 and 83-93 no dates or authors or clear indication of source.

Guided-Wave Acoustooptic Bragg Modulators for Wide-Band Integrated Optic Communications and Signal Processing; Chen S. Tsai, 1979 IEEE Transactions on Circuits and Systems, vol. CAS-26, No. 12, Dec. 1979.

*Primary Examiner*—Eugene R. LaRoche
*Assistant Examiner*—Evelyn A. Lester
*Attorney, Agent, or Firm*—Sughrue, Mion, Zinn Macpeak & Seas

[57] ABSTRACT

A light modulator includes an interdigital transducer having a plurality of interdigital electrode fingers for generating surface elastic waves having respective different frequencies in an optical waveguide. The electrode fingers are oriented in different directions to enable the generated surface elastic waves to diffract a light beam guided through the optical waveguide, while satisfying the Bragg condition for diffraction. A driver applies high-frequency voltages having respective frequencies to the electrode fingers to generate the surface elastic waves, respectively. The application of the high-frequency voltages to the electrode fingers is turned on and off by switching circuits. The light modulator is incorporated in a recording device.

4 Claims, 14 Drawing Sheets

F I G. 17
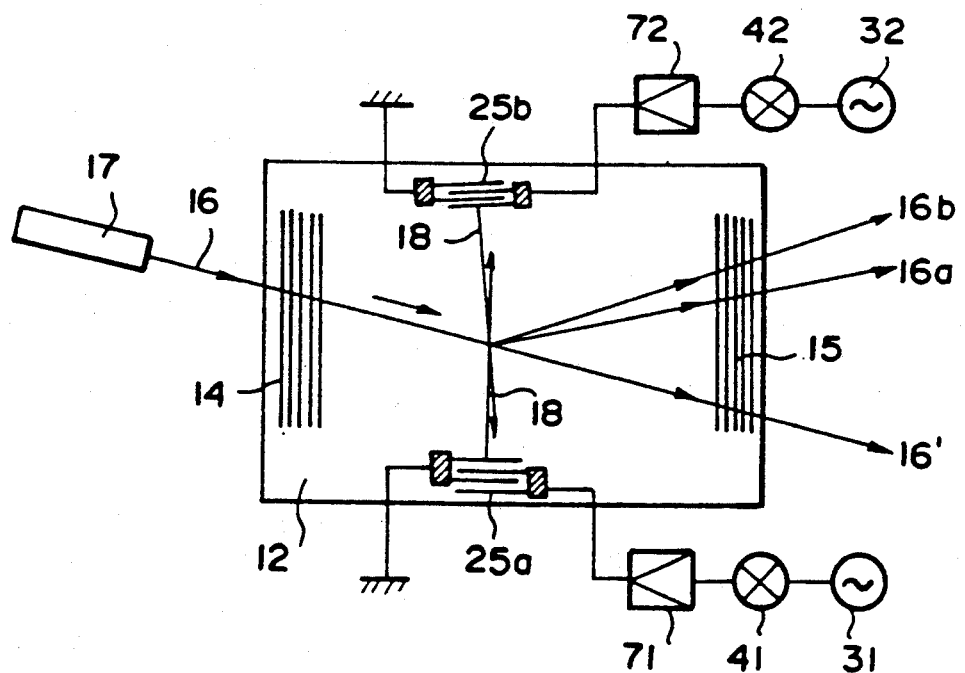

LIGHT MODULAR AND RECORDING DEVICE EMPLOYING SAME

BACKGROUND OF THE INVENTION

1. Field of the Invention

The present invention relates to a light modulator, more particularly a waveguide-type light modulator which can produce a plurality of independently modulated light beams, and a recording device which incorporates such a light modulator.

2. Description of the Prior Art

One conventional light modulator which can divide a single light beam into a plurality of light beams and independently modulate the divided light beams, incorporates a bulk-crystal-type acoustooptic device. In the known light modulator, ultrasonic waves with combined frequencies are propagated in the bulk-crystal type acoustooptic device, and a light beam introduced into the device is Bragg-diffracted in different directions by the ultrasonic waves. When the ultrasonic waves having different frequencies are turned on and off, i.e., intermittently propagated, the respective diffracted light beams are turned on and off or modulated.

Japanese Unexamined Patent Publication No. 63(1988)-103208 discloses a light modulator employing an optical waveguide for modulating a plurality of light beams. The disclosed light modulator serve as a portion of an optical write head. The light modulator comprises an optical waveguide made of a material capable of propagating a surface elastic wave, a surface elastic wave generating means responsive to an applied high-frequency voltage for generating, in the optical waveguide, a surface elastic wave having a frequency corresponding to the frequency of the applied high-frequency voltage, and for directing the generated surface elastic wave across the light path of a parallel beam of light which is guided in the optical waveguide, a driver circuit for applying a plurality of high-frequency voltages having different frequencies to the surface elastic wave generating means, and a modulating means for turning on and off or modulating the high-frequency voltages.

In the light modulator which employs the bulk-crystal-type acoustooptic device, a transducer which generates ultrasonic waves is required to be bonded to an acoustooptic medium, and then to be ground to a predetermined thickness highly accurately. If a wide frequency band is desired, then the thickness of the transducer ranges from several microns to several tens of microns. However, grinding the transducer to such a very thin layer with high accuracy requires a very sophisticated grinding technique. The light modulator of this type cannot be manufactured at a high production rate and is very expensive.

The light modulator which employs the optical waveguide disclosed in the above publication is free of such a problem because it employs an interdigital transducer (IDI) as the surface elastic wave generating means. More specifically, the IDT can easily be fabricated by electron beam patterning or photolithography since these fabrication processes have already been established and widely used for the fabrication of semiconductors.

In the light modulator disclosed in the above publication, all generated surface elastic waves having different frequencies are propagated in one direction. Therefore, the light beam guided in the optical waveguide may be diffracted very efficiently by a surface elastic wave having a certain frequency, but may not be diffracted very efficiently by a surface elastic wave having a widely different frequency. Such a drawback is eliminated when the band of combined surface elastic wave frequencies is reduced. If the speed at which the light beam is modulated is constant under such a condition, however, the number of light beams which ca be divided from the introduced light beam is reduced, and the light modulator has a limited performance. The maximum number N of divided light beams is expressed by:

$$N = \tau \cdot \Delta f + 1 \ldots \quad (1)$$

where $\Delta f$ is the band of surface elastic wave frequencies, and $\tau$ is the time required for the surface elastic wave to travel across the light beam ($\tau = D/v$: D is the width of the light beam, and v is the speed of the surface elastic wave). According to the equation (1), the more the divided light beams (i.e., the greater the band $\Delta f$) and the higher the speed of modulation (i.e., the shorter the time $\tau$ since the modulation speed $\simeq 1/\tau$), the higher the performance of the light modulator becomes.

In the case where the light modulator is incorporated in a recording device, for example, because more dots can be recorded in a given period of time as there are more divided light beams and the speed of modulation is higher, if the band $\Delta f$ of surface elastic wave frequencies is small then the number of recorded dots is reduced, and the practical value of the light modulator is lowered.

With the arrangement disclosed in the above publication, the surface elastic waves having different frequencies ar generated from different electrode fingers of the IDT, and the time required for the surface elastic waves excited by the IDT to reach a location where they diffract the light beam, varies from surface elastic wave to surface elastic wave. Even if the high-frequency voltages of different frequencies are applied to the IDT at the same time, therefore, the guided light beam is diffracted at different times by the surface elastic waves. Consequently, the divided light beams are modulated at different times. If an image is recorded using such a plurality of modulated light beams, the recorded image will be distorted.

SUMMARY OF THE INVENTION

In view of the aforesaid conventional drawbacks, it is an object of the present invention to provide an optical-waveguide-type light modulator which can diffract a light beam efficiently with surface elastic waves having different frequencies, can modulate divided light beams at high speed, and can produce a large number of divided light beams.

Another object of the present invention is to provide an optical-waveguide-type light modulator which can modulate light beams at one time.

Still another object of the present invention is to provide a recording device which incorporates a light modulator, for recording a plurality of lines simultaneously.

According to the present invention, there is provided a first light modulator comprising an optical waveguide made of a material capable of propagating surface elastic waves, an interdigital transducer having a plurality of interdigital electrode fingers for generating surface elastic waves having different respective different frequencies in the optical waveguide, the electrode fingers being oriented in different directions to enable the generated surface elastic waves to diffract a light beam guided through the optical waveguide, while satisfying the Bragg condition for diffraction, a driver for applying high-frequency voltages having respective frequencies to the electrode fingers to generate the surface elastic waves, respectively, and switching means for turning on and off the application of the high-frequency voltages to the electrode fingers.

With the electrode fingers being oriented in different directions, the Bragg condition for diffraction can be satisfied between the surface elastic waves and the light beam even if the frequencies of the surface elastic waves generated by the electrode fingers are widely different from each other. Consequently, the frequency band of the surface elastic waves can be widened.

Preferably, the electrode fingers are arranged such that the surface elastic waves diffract the light beam at a substantially single location on the light path of the light beam. With this arrangement, locations where the light beam is diffracted by the respective different surface elastic waves overlap each other, but are not spaced from each other along the light path of the light beam. When the light beam is divided into N light beams and if the light beam i diffracted by the respective surface elastic waves with equal diffraction efficiency, then the intensity of a light beam diffracted by a surface elastic wave varies in N ways depending on how another surface elastic wave is turned on and off. This holds true between all the divided light beams. In some applications of the light deflector, such variations in the light beam intensities have to be compensated for. If the intensity of each light beam varies in N ways, as described above, then variations in the light beam intensities can be compensated for relatively easily.

If the locations where the light beam is diffracted by the respective surface elastic waves were spaced from each other along the light path of the light beam, with the light beam being divided into N light beams, then the intensity of each diffracted light beam would vary in $(2^N - 1)$ ways, and hence complex intensity variation compensation would be required.

Furthermore, the electrode fingers are preferably independently provided for generating the surface elastic waves, respectively, and the electrode fingers which generate the surface elastic waves having respective different frequencies of successive magnitudes are successively arranged alternately on both sides of the light beam guided through the optical waveguide.

The electrode fingers are spaced at uniform intervals, thus making up a uniform interdigital transducer (IDT). The uniform IDT is more advantageous than a tilted-finger chirped IDT or the like which generates surface elastic waves having different frequencies, in that it can convert high-frequency electric power into surface elastic waves with high efficiency.

However, since the surface elastic waves excited by the uniform IDT have respective frequency bands, the frequency bands of those surface elastic waves whose frequencies are close to each other tend to overlap each other. If a plurality of such IDTs are positioned such that the surface elastic waves generated thereby diffract the light beam at a substantially single location on the light path, then the surface elastic wave generated by one IDT and going toward the light beam tends to be absorbed by another IDT, resulting in a reduction in the energy.

The IDTs are disposed alternately on both sides of the light beam such that those IDTs which produce surface elastic waves having overlapping frequency bands are positioned one on each side of the light beam. Stated otherwise, one of the IDTs which produce surface elastic waves having close frequency bands is not positioned within the path in which the surface elastic wave generated by the other IDT travels toward the light beam. As a consequence, the absorption of surface elastic waves by the IDTs is avoided.

According to the present invention, there is provided a second light modulator comprising an optical waveguide made of a material capable of propagating surface elastic waves, an interdigital transducer having a plurality of interdigital electrode fingers for generating surface elastic waves having respective different frequencies in the optical waveguide, the electrode fingers being arranged to enable the generated surface elastic waves to diffract a light beam guided through the optical waveguide, a driver for applying high-frequency voltages having respective frequencies to the electrode fingers to generate the surface elastic waves, respectively, switching means for turning on and off the application of the high-frequency voltages to the electrode fingers, and delay circuits for receiving control signals which control operation of the switching means before the control signals are applied to the switching means, for delaying the control signals by times corresponding to distances between the electrode fingers connected to the switching means and a location where the light beam is diffracted by the surface elastic waves, thereby to substantially equalize times required for the surface elastic waves to reach the location after the control signals are applied to the delay circuits.

When the control signals for generating the surface elastic waves of respective frequencies are sent at the same timing by the delay circuits, the surface elastic waves reach the diffracting location substantially simultaneously. Therefore, light beams which are diffracted by the respective surface elastic waves are modulated at the same timing.

According to the present invention, there is also provided a recording device comprising an optical waveguide made of a material capable of propagating surface elastic waves, an interdigital transducer having a plurality of interdigital electrode fingers for generating surface elastic waves having respective different frequencies in the optical waveguide, the electrode fingers being arranged to enable the generated surface elastic waves to diffract a light beam guided through the optical waveguide, a driver for applying high-frequency voltages having respective frequencies to the electrode fingers to generate the surface elastic waves, respectively, switching means for turning on and off the application of the high-frequency voltages to the electrode fingers, a recording light source for generating the light beam to be introduced into the optical waveguide, a light deflector for deflecting a plurality of diffracted light beams emitted in different directions out of the optical waveguide, so as to scan a recording medium in a main scanning direction across a direction in which the diffracted light beams are arrayed, auxiliary scanning means for scanning the diffracted light beams on the recording medium in an auxiliary scanning direction which is substantially perpendicular to the main scanning direction, and a modulation control circuit for controlling operation of the switching means based on a recording signal.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 17 is a schematic plan view of a light modulator according to yet another embodiment of the present invention;

DESCRIPTION OF THE PREFERRED EMBODIMENTS

Figure 1:
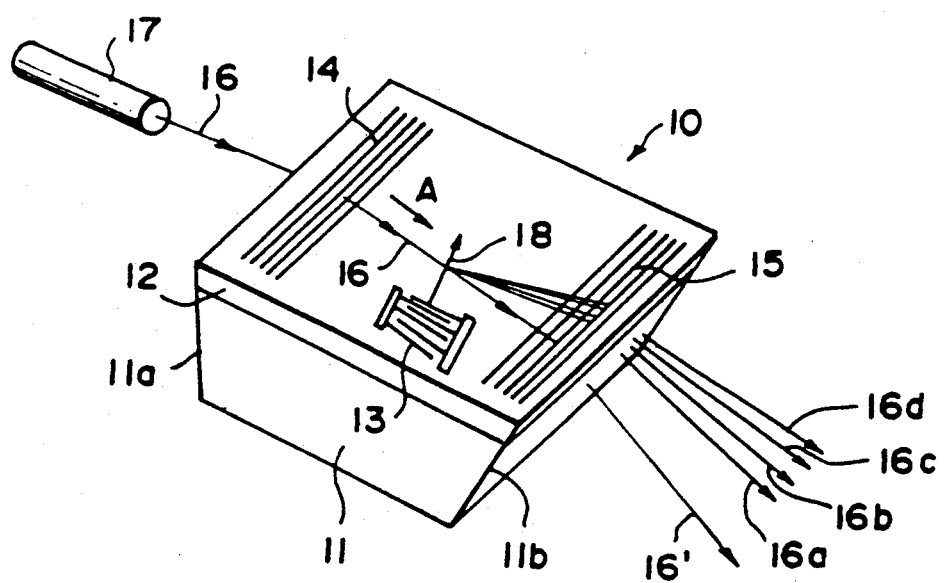
FIG. 1 is a schematic perspective view of a light modulator according to an embodiment of the present invention.

Like or corresponding parts are denoted by like or corresponding reference numerals throughout views.

Figure 2:
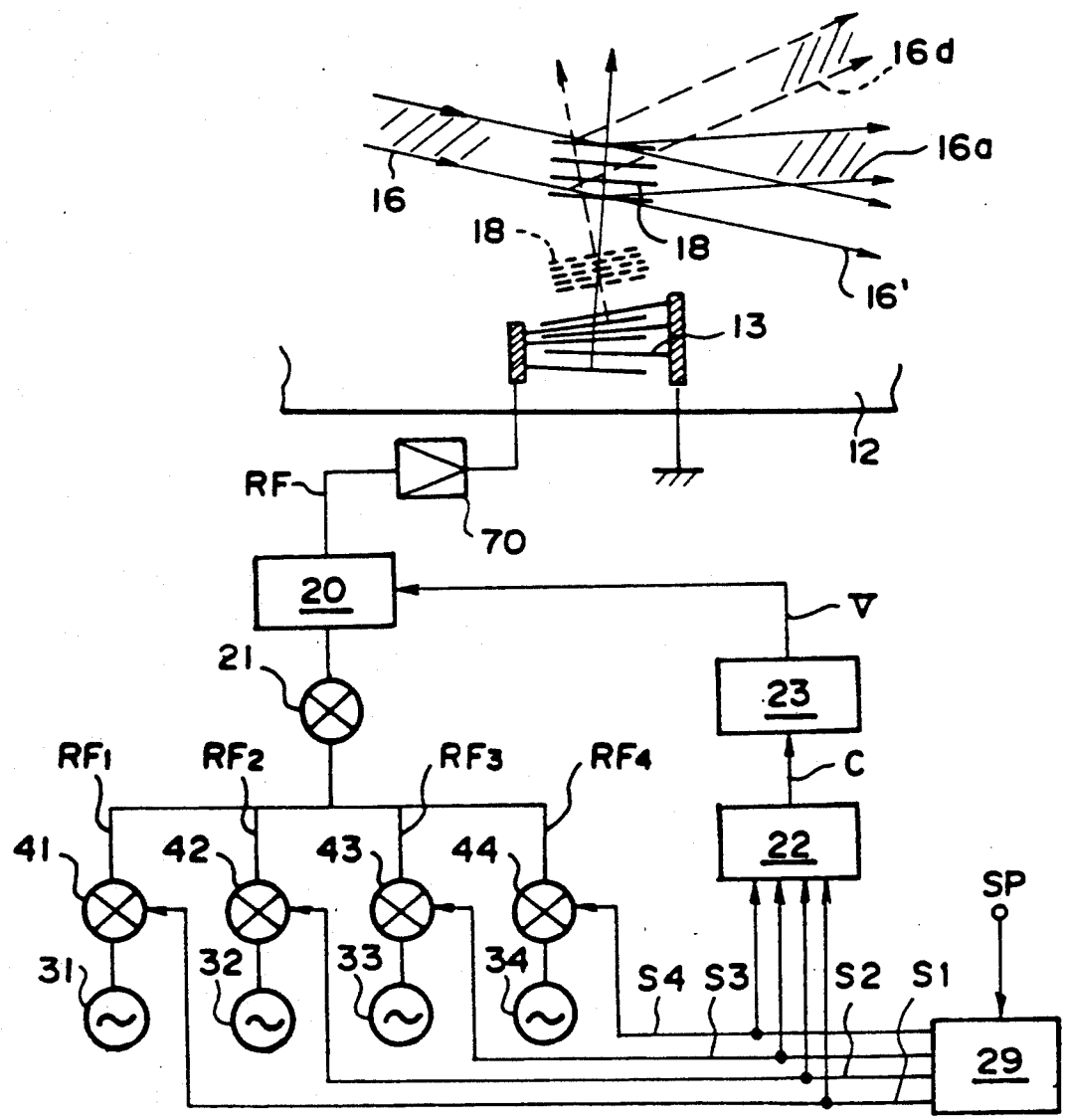
FIG. 2 is a schematic diagram showing a portion of the light modulator and an electric circuit connected thereto.

FIG. 1 shows a light modulator 10 according to an embodiment of the present invention. FIG. 2 shows a portion of the light modulator, around an interdigital transducer (IDT), and an electric circuit connected to the IDT.

As shown in FIG. 1, the light modulator 10 comprises a slab-shaped optical waveguide 12 mounted on a transparent substrate 11, an IDT 13 disposed on the optical waveguide 12, a linear grating coupler (LGC) 14 for introducing a light beam into the optical waveguide 12, and a linear grating coupler (LGC) 15 for emitting a light beam out of the optical waveguide 12, the LGCs 14, 15 being disposed on the optical waveguide 12 and spaced from each other. The IDT 13 is positioned between the LGCs 14, 15. The IDT 13 is in the form of a tilted-finger chirped IDT whose electrode fingers are spaced at progressively varying intervals and oriented in progressively varying directions.

In the embodiment shown in FIG. 1, the substrate 11 comprises a wafer of $LiNbO_3$, and the optical waveguide 12 comprises a Ti-diffused film on the surface of the $LiNbO_3$ wafer. However, the substrate 11 may be a crystalline substrate of sapphire, Si, or the like. The optical waveguide 12 may be formed by sputtering, evaporating, or otherwise depositing another material on the substrate 11. Optical waveguides are described in detail in *Integrated Optics* edited by T. Tamir, Topics in Applied Physics, Vol. 7, published by Springer-Verlag, 1975, and *Optical Integrated Circuits* written by Nishihara, Haruna, and Suhara, and published by Ohm Co., 1985. The optical waveguide 12 of the present invention may be any of the known optical waveguides. However, the optical waveguide 12 should be made of a material such as the Ti-diffused film referred to above, is capable of propagating a surface elastic wave. The optical waveguide 12 may be of a laminated structure of two or more films or layers.

The tilted-finger chirped IDT 13 may be formed as follows, for example: a positive electron beam resist is coated on the surface of the optical waveguide 12; a electrically conductive thin film of Au is evaporated on the positive electron beam resist., an electrode pattern is then printed with an electron beam., the thin film of Au is peeled off; the electrode pattern is developed; then thin films of Cr and Al are evaporated onto the surface formed thus far, and unnecessary layers are lifted off in an organic solution.

A light beam 16 to be modulated by the light modulator 10 is emitted by a laser source 17 which may comprise an He - Ne laser or the like. The laser source 17 is positioned with respect to the light modulator 10 such that the light beam 16, which is a parallel beam of light, passes through an obliquely cut end surface 11a of the substrate 11, travels through the optical waveguide 12, and is applied to the LGC 14. The light beam 16 which is applied to the LGC 14 is diffracted by the LGC 14, and then travels in the optical waveguide 12 in a guided mode in the direction indicated by the arrow A.

As shown in FIG. 2, four parallel high-frequency oscillators 31, 32, 33, 34, for example, are connected to the tilted-finger chirped IDT 13 through an RF amplifier 70, an attenuator 20, and an adder 21. Switching circuits 41, 42, 43, 44 are connected between the adder 21 and the high-frequency oscillators 31, 32, 33, 34. The high-frequency oscillators 31, 32, 33, 34 generate high-frequency voltages $RF_1$, $RF_2$, $RF_3$, $RF_4$, respectively, having respective different frequencies $f_1$, $f_2$, $f_3$, $f_4$ ($f_1 < f_2 < f_3 < f_4$). These high-frequency voltages $RF_1$, $RF_2$, $RF_3$, $RF_4$ are applied to the tilted-finger chirped IDT 13 when the respective switching circuits 41, 42, 43, 44 are closed.

When the high-frequency voltages $RF_1$, $RF_2$, $RF_3$, $RF_4$ are applied, the tilted-finger chirped IDT 13 generates surface elastic waves 18 having respective frequencies $f_1$, $f_2$, $f_3$, $f_4$. When plural ones of the high-frequency voltages $RF_1$, $RF_2$, $RF_3$, $RF_4$ are simultaneously applied to the tilted-finger chirped IDT 13, the generated surface elastic wave 18 has a frequency which is the combination of the frequencies of the applied voltages If all the high-frequency voltages $RF_1$, $RF_2$, $RF_3$, $RF_4$ are simultaneously applied to the tilted-finger chirped IDT 13, then the generated surface elastic wave 18 has a frequency which is the combination of the frequencies $f_1$, $f_2$, $f_3$, $f_4$.

The tilted-finger chirped IDT 13 is arranged such that the surface elastic wave 18 generated thereby travels in a direction across the light path of the light beam 16 which is guided through the optical waveguide 12. Therefore, the light beam 16 is propagated transversely across the surface elastic wave 18, at which time the light beam 16 is Bragg-diffracted due to an acoustooptic interaction between itself and the surface elastic wave 18.

The Bragg diffraction of a guided light beam with a surface elastic wave, which is well known in the art, will briefly be described below. If it is assumed that the direction in which the surface elastic wave 18 is propagated in the optical waveguide 12 and the direction in which the light beam 16 travels in the optical waveguide 12 form an angle $\theta$ therebetween, then the angle $\delta$ of deflection of the light beam 16 due to an acoustooptic interaction between itself and the surface elastic wave 18, is $\delta = 2\theta$, which is expressed as follows:

$$\begin{aligned} 2\theta &= 2\sin^{-1}\{\lambda/(2Ne \cdot \Lambda)\} \\ &\simeq \lambda/(Ne \cdot \Lambda) \\ &= \lambda \cdot f/(Ne \cdot v) \end{aligned}$$

where $\lambda$ is the wavelength of the light beam 16, Ne is the effective refractive index of the optical waveguide 12, and $\Lambda$, f, v are the wavelength, frequency, and speed, respectively, of the surface elastic wave 18. Thus, the diffraction angle $2\theta$ or $\delta$ is substantially proportional to the frequency f of the surface elastic wave 18. Therefore, when the high-frequency voltages $RF_1$, $RF_2$, $RF_3$, $RF_4$ are applied to the tilted-finger chirped IDT 13, diffracted light beams 16a, 16b, 16c, 16d which travel in respective different directions are produced as shown in FIG. 2. As shown in FIG. 1, these diffracted light beams 16a, 16b, 16c, 16d are diffracted, together with a zeroth-order light beam 16', by the LGC 15 and emitted out of the light modulator 10 from an obliquely cut end surface 11b of the substrate 11.

The switching circuits 41, 42, 43, 44 can be opened and closed by modulating signals S1, S2, S3, S4 which are applied respectively thereto. Therefore, the application of the high-frequency voltages $RF_1$, $RF_2$, $RF_3$, $RF_4$ to the tilted-finger chirped IDT 13 can be turned on and off by these modulating signals S1, S2, S3, S4, respectively. As a result, the components of the surface elastic wave 18 which have the respective frequencies $f_1$, $f_2$, $f_3$, $f_4$ can be turned on and off, and hence the light beams 16a, 16b, 16c, 16d can be modulated or turned on and off by the respective modulating signals S1, S2, S3, S4. Generation of the modulating signals S1, S2, S3, S4 will be described later on.

Figure 3:
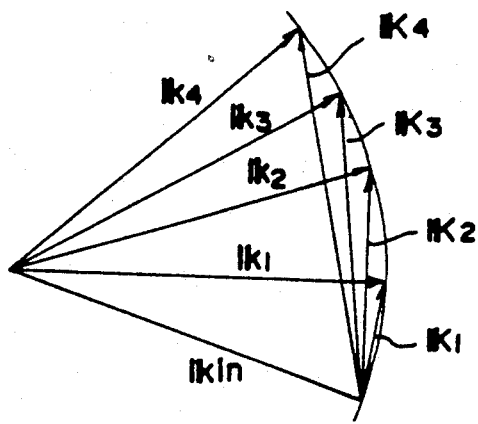
FIG. 3 is a diagram of wave vectors, illustrative of the diffraction of a light beam in the light modulator.

The tilted-finger chirped IDT 3 is constructed such that electrode fingers at the lower end thereof in FIG. 2 excite the surface elastic wave 18 having the frequency $f_1$ (indicated by the solid lines) and electrode fingers at the upper end thereof excite the surface elastic wave 18 having the frequency $f_4$ (indicated by the broken lines). The surface elastic waves having the frequencies $f_2$, $f_3$ are excited by electrode fingers positioned between the upper and lower ends of the tilted-finger chirped IDT 13. The electrode fingers of the tilted-finger chirped IDT 13 are oriented in progressively different directions such that the surface elastic waves 18 having the frequencies $f_1$, $f_2$, $f_3$, $f_4$ diffract the light beam 16 in a substantially single location on the light path of the light beam 16 while satisfying the Bragg condition:

$$|k_{IN} + K| = |k|$$

where $|k_{IN}|$, $|K|$, $|k|$ are the wave vectors of the light beam 16 before it is diffracted, the surface elastic wave 18, and the diffracted light beam, respectively. The relationship between these wave vectors is shown in FIG. 3. In FIG. 3, $|K_1|, |K_2|, |K_3|, |K_4|$ represent the wave vectors of the surface elastic waves 18 having the frequencies $f_1$, $f_2$, $f_3$, $f_4$, respectively, and $|k_1|, |k_2|, |k_3|, |k_4|$ represent the wave vectors of the diffracted light beams 16a, 16b, 16c, 16d.

Figure 4:
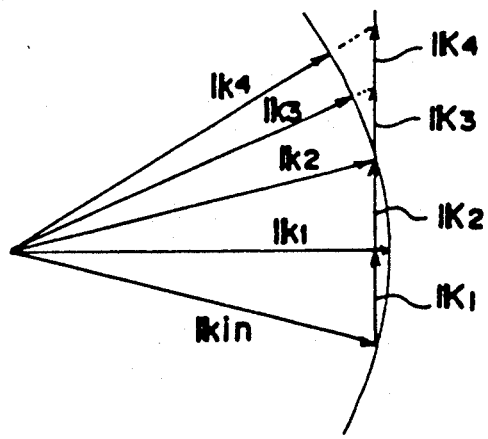
FIGS. 4 and 5 are diagrams of wave vectors, illustrative of the diffraction of a light beam in conventional light modulators.
Figure 5:
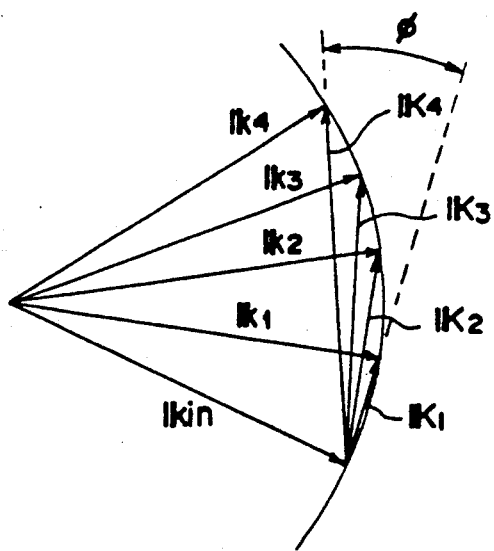

The relationship between the wave vectors of light beams and surface elastic waves in the light modulator disclosed in Japanese Unexamined Patent Publication No. 63(1988)-103208 is shown in FIG. 4. Since the wave vectors $|K_1|$ through $|K_4|$ of the surface elastic waves are oriented in one direction, the Bragg condition for diffraction is satisfied between a surface elastic wave of one frequency (i.e., the surface elastic wave having the wave vector $|K_2|$ in FIG. 4) and one light beam, but the Bragg condition for diffraction is not satisfied between the surface elastic waves of other frequencies and other light beams. While the light beams are diffracted to some extent even if the Bragg condition for diffraction is not fully satisfied, the diffraction efficiency is necessarily low.

FIG. 4 shows the relationship between the wave vectors of light beams and ultrasonic waves in the conventional bulk-crystal-type acoustooptic device. The wave vectors of the ultrasonic waves are indicated by $|K_1|$ through $|K_4|$ in FIG. 4. The Bragg condition for diffraction is satisfied between the ultrasonic waves of respective wavelengths and the light beams, utilizing the spreading property of the ultrasonic waves (at least a spreading angle $\phi$ is required). Therefore, only some of the ultrasonic waves contribute to the diffraction of the light beams, and hence no high diffraction efficiency can be expected.

In the light modulator according to the present invention the Bragg condition is satisfied between the light beam 16 and all the surface elastic waves having the frequencies $f_1$ through $f_4$. Since all the powers of the surface elastic waves 18 having the frequencies $f_1$ through $f_4$ contribute to the diffraction of the light beam 16, a high diffraction efficiency is achieved.

Figure 6:
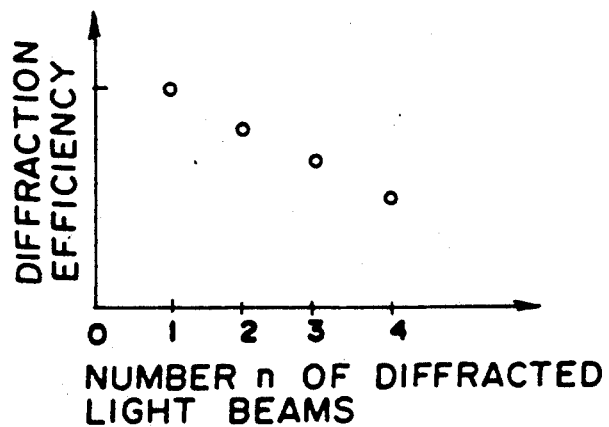
FIG. 6 is a graph showing the relationship between the number of diffracted light beams and diffraction efficiency.

An arrangement for keeping the intensities of the diffracted light beams 16a through 16d at a constant level irrespective of how they may be modulated, will be described below. In the case where the light beams 16a through 16d are diffracted in a substantially common diffracting location, the efficiency with which one of the light beams is diffracted (diffraction efficiency) and the number n of diffracted light beams are related to each other as shown in FIG. 6. As seen from FIG. 6, the diffraction efficiency of one diffracted light beam is maximum when there is no other diffracted light, i.e., the number n is n=1, and is progressively lowered as the number n is increased. The number of diffraction efficiency levels is the same as the number N of divided light beams, and is 4 in the above embodiment.

Figure 7:
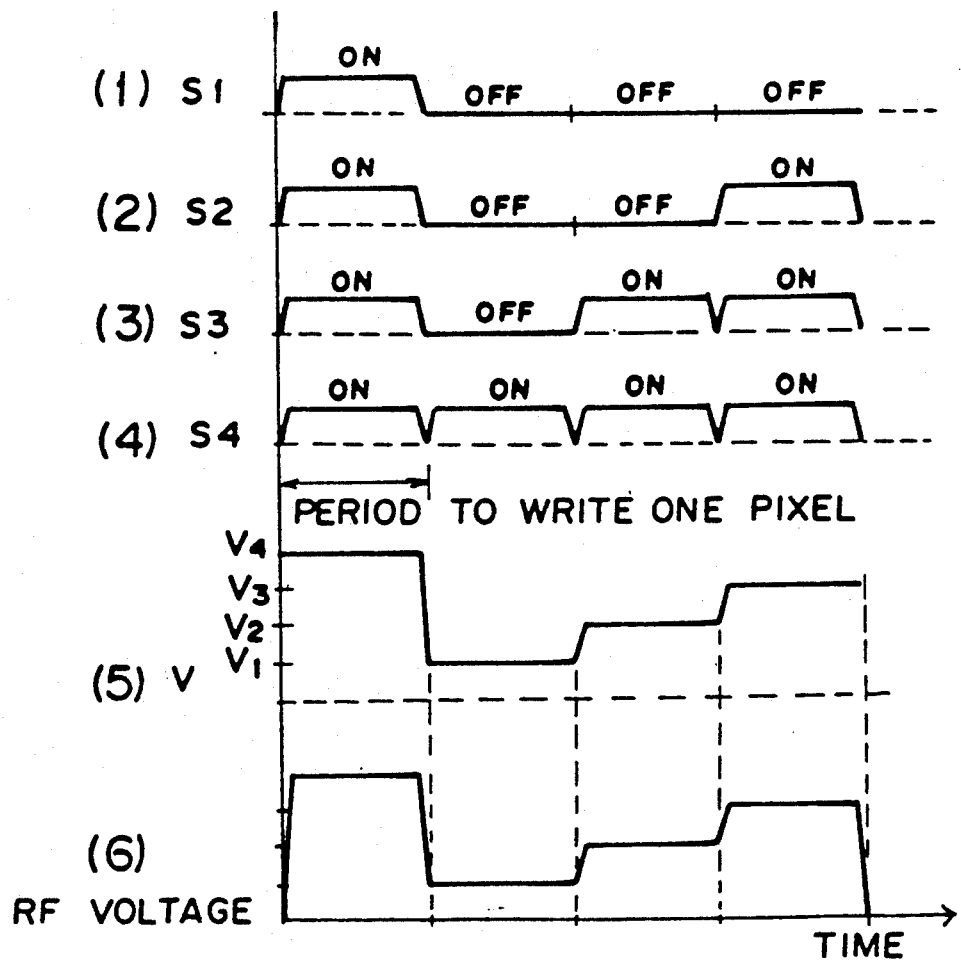
FIG. 7 is a graph showing the relationship between modulating signals, an attenuator control voltage, and a high-frequency voltage in the light modulator according to the embodiment of the present invention.

To compensate for the variations of the diffraction efficiency shown in FIG. 6, the modulating signals S1 through S4 are supplied to a controller 22 as well as the switching circuits 41 through 44, as shown in FIG. 2. The controller 22 determines how many command signals which instruct the switching circuits 41 through 44 to be closed (i.e., to turn the high-frequency voltages $RF_1$ through $RF_4$) are contained in the modulating signals S1 through S4 at each time, and generates a signal C which can have four levels dependent on the determined number of signals. The signal C is then applied to a voltage generator 23, which produces a control voltage V whose level is variable between four levels, as shown at (5) in FIG. 7. Therefore, the level of the output voltage V of the voltage generator 23 varies depending on the number of command signals which turn on the high-frequency voltages $RF_1$ through $RF_4$. More specifically, if one of the high-frequency voltages $RF_1$ through $RF_4$ is to be turned on, then a control voltage V of a minimum level $V_1$ is produced by the voltage generator 23. If two, three, or four high-frequency voltages are to be turned on, then a control voltage V having a level $V_2$, $V_3$, or $V_4$ is produced by the voltage generator 23. The control voltage V is then applied to the attenuator 20. The attenuator 20 is constructed such that as the applied control voltage V is higher, the attenuator 20 lowers its attenuation factor. The level of the high-frequency voltage RF which has passed through the attenuator 20 is therefore controlled to have one of four levels at a time, as shown at (6) in FIG. 7. The levels of the control voltage V and the levels of the high-frequency voltage RF shown respectively at (5) and (6) in FIG. 7 are shown as corresponding to the levels of the modulating signals S1 through S4 shown at (1) through (4) in FIG. 7.

With the level of the high-frequency voltage RF being thus controlled, the light beam 16 is diffracted by the surface elastic wave 18 of higher power as the number n of diffracted light beams is greater. Therefore, the intensities of the diffracted light beams 16a through 16d are kept at a substantially constant level irrespective of the number n of diffracted light beams.

Since the diffracted light beams 16a through 16d are diffracted at substantially the same location, the intensities of the diffracted light beams 16a through 16d vary with the same characteristics when not corrected, and hence can be corrected relatively easily. If any variations in the intensities of the diffracted light beams 16a through 16d are not problematic, the above correcting process may not be carried out.

While the introduced light beam 16 is divided into four light beams in the above embodiment, the number of divided light beams is not limited to 4. In the IDT 13 employed in the present invention, the distances between the electrode fingers can greatly be reduced, and the electrode fingers can be differently tilted or slanted in order to meet the Bragg condition between the surface elastic waves of respective frequencies and the light beams. According to the light modulator of the present invention, therefore, the frequency band Δf of the surface elastic wave may be widened, increasing the number N of divided light beams. More specifically, if the surface elastic wave 18 has minimum and maximum frequencies of 0.5 GHz and 1 GHz, with the frequency band Δf=0.5 GHz, and the width D of the light beam 16 is D=100 μm and the speed v of the surface elastic wave is v=3500 m/s, then the number N of divided light beams is N=15 and the modulation speed is 35 MHz as calculated according to the equation (1). If the modulation were to be achieved with one light beam, the modulation would have to be effected at a frequency of 15×35=525 MHz, and the light modulator and the associated electric circuit for achieving such modulation would not easily be fabricated.

Figure 8:
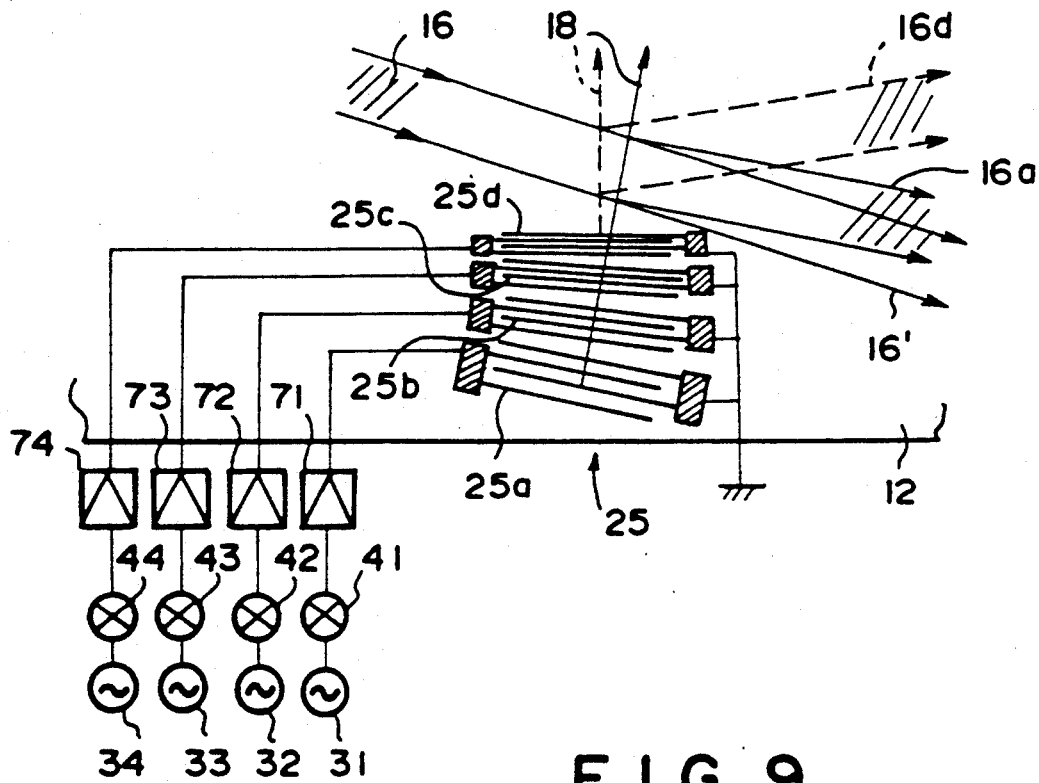
FIGS. 8 and 9 are schematic plan views of other interdigital transducers which can be employed in the present invention.
Figure 9:
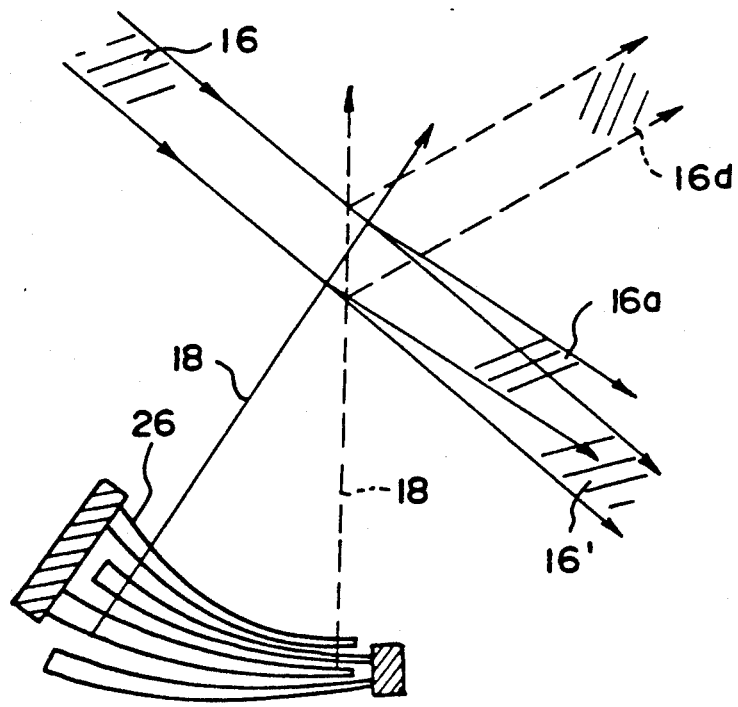

The tilted-finger chirped IDT 13 may be replaced with a frequency-separated IDT as shown in FIG. 8 or a curved-finger IDT as shown in FIG. 9.

A frequency-separated IDT 25 shown in FIG. 8 comprises small IDTs 25a, 25b, 25c, 25d having electrode fingers spaced at different intervals, the IDTs 25a, 25b, 25c, 25d being dedicated to particular frequencies. The IDTs 25a, 25b, 25c, 25d are differently directed such that surface elastic waves 18 generated respectively from the IDTs 25a, 25b, 25c, 25d diffract a light beam 16 in a substantially single location on the light path of the light beam 16 while satisfying the Bragg condition for diffraction. In each of the IDTs 25a through 26d, the electrode fingers are spaced at a constant interval. To the respective IDTs 25a, 25b, 25c, 25d, there are connected RF amplifiers 71, 72, 73, 74, switching circuits 41, 42, 43, 44, and high-frequency oscillators 31, 32, 33, 34.

An IDT 26 illustrated in FIG. 9 comprises a curved-finger IDT as disclosed in *Guided-Wave Acoustooptic Bragg Modulators for Wide-Band Integrated Optic Communications and Signal Processing* by C. S. TSAI, IEEE Transactions on Circuits and Systems, vol. CAS-26, No. 12, p1072, for example. The curved-finger IDT 26 has arcuate electrode fingers which are spaced at continuously varying intervals, and can generate surface elastic waves 18 having different frequencies in different directions, respectively. The electrode fingers of the curved-finger IDT 26 which generate surface elastic waves having respective frequencies $f_1$, $f_2$, $f_3$, $f_4$ are arranged such that the surface elastic waves generated respectively thereby diffract the light beam 16 in a substantially single location on the light path of the light beam 16 while satisfying the Bragg condition for diffraction.

Figure 10:
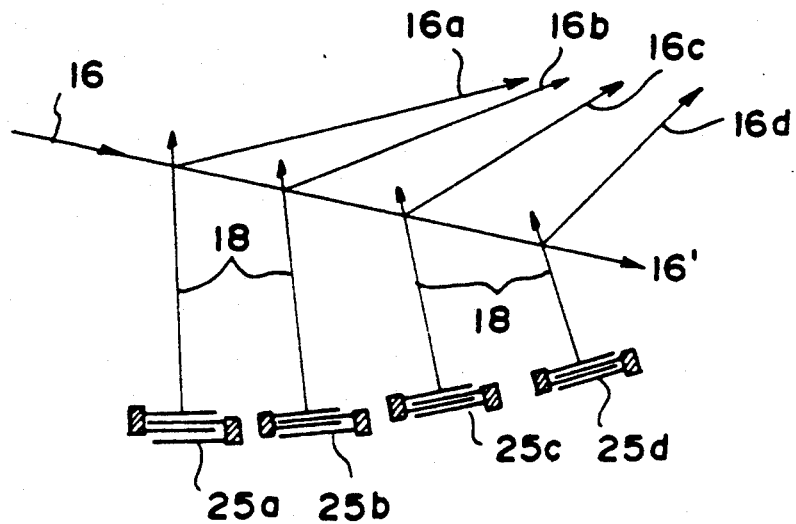
FIGS. 10 and 11 are schematic plan views showing other interdigital transducer arrangements according to the present invention.
Figure 11:
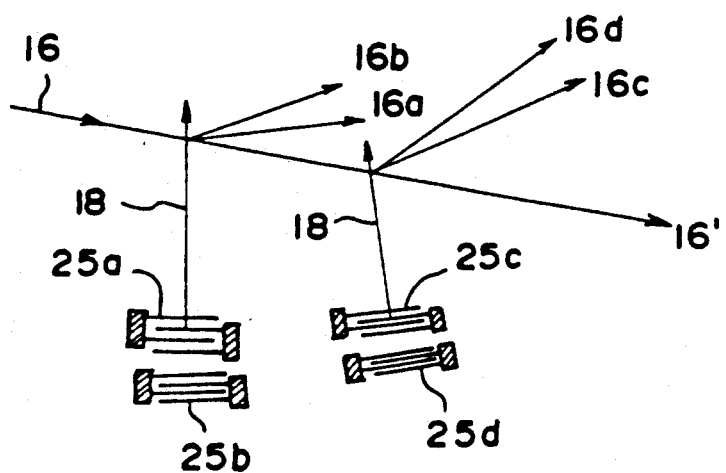

If the frequency-separated IDT 25 is employed, the IDTs 25a, 25b, 25c, 25d may be positioned to diffract the light beam 16 in different locations on the light path, as shown in FIGS. 10 and 11. In the arrangements shown in FIGS. 10 and 11, variations in the intensities of diffracted light beams 16a through 16d may be corrected or not.

The optical waveguide 12 may be formed by a proton exchange or annealing after a proton exchange, instead of a Ti-diffused film. In order to increase the number N of diffracted light beams or increase the rate of modulation, it is more effective to use a light beam 16 having a smaller beam width D. However, a light beam 16 having a smaller beam width D is more liable to cause optical damage to the optical waveguide 12. The optical waveguide 12 which is formed by a proton exchange or annealing after a proton exchange is less susceptible to optical damage, and hence is particularly preferable for use in the present invention. From the standpoint of minimizing optical damage, a LiNbO$_3$ substrate which is doped with MgO is preferred to an ordinary LiNbO$_3$ substrate.

Figure 12:
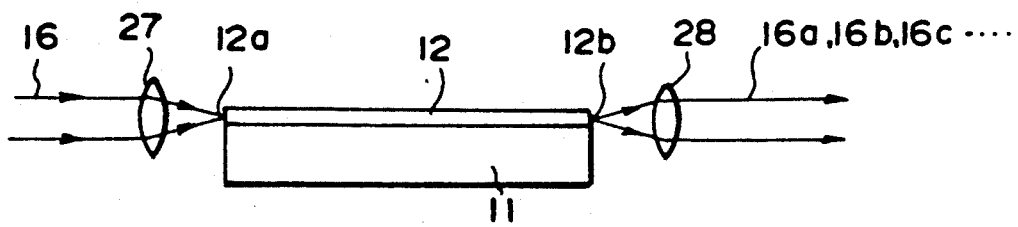
FIG. 12 is a side elevational view of a light modulator according to another embodiment of the present invention.

The light beam 16 is introduced into the optical waveguide 12 through the LGC 14, and the light beams 16a through 16d are emitted out of the optical waveguide 12 through the LGC 15 in the above embodiment. However, as shown in FIG. 12, a light beam may be applied to an end surface 12a of the optical waveguide 12 through a cylindrical lens 27, and a diffracted light beam may be emitted from an end surface 12b of the optical waveguide 12 through a cylindrical lens 28.

Variations in the intensities of the diffracted light beams 16a through 16d may be compensated for by controlling operation of the high-frequency oscillators 31 through 34 thereby to vary the levels of the high-frequency voltages RF$_1$, RF$_2$, RF$_3$, RF$_4$, rather than varying the attenuation factor of the attenuator 20.

A recording device which incorporates the light modulator 10 will be described below with reference to FIG. 13. The recording device, generally denoted at 50, comprises the light modulator 10, a laser source 17 as a recording light source for applying a light beam 16 to the light modulator 10, a polygon mirror 51 serving as a light deflector, a cylindrical platen 53 for holding a photosensitive member 52, which is one example of a recording medium, and an auxiliary scanning motor 54 for rotating the platen 53 about its own axis in the direction indicated by the arrow Y. The cylindrical platen 53 serves as an auxiliary scanning means. Although not shown in FIG. 13, the light modulator 10 is energized by the electric circuit shown in FIG. 2. More specifically, a modulation control circuit 29 shown in FIG. 2 is supplied with a recording signal SP and produces parallel modulating signals S1 through S4 based on the recording signal SP.

Diffracted light beams 16a, 16b, 16c, 16d which are emitted out of the light modulator 10 are reflected and deflected by the polygon mirror 51, pass through an fθ lens 55, and scans the photosensitive member 52 in a main scanning direction indicated by the arrow X. The polygon mirror 51 is arranged such that the light beams 16a through 16d scan the photosensitive member 52 in the main scanning direction which is normal to the direction in which the light beams 16a through 16d are arrayed.

At the same time that the photosensitive member 52 is scanned in the main scanning direction by the light beams 16a through 16d, the photosensitive member 52 is fed in the auxiliary scanning direction Y which is substantially perpendicular to the main scanning direction X. Accordingly, the photosensitive member 52 is two-dimensionally scanned by the light beams 16a through 16d. When the light beams 16a through 16d are modulated or turned on and off, information represented by the recording signal SP (FIG. 2) is recorded on the photosensitive member 52.

Figure 14:
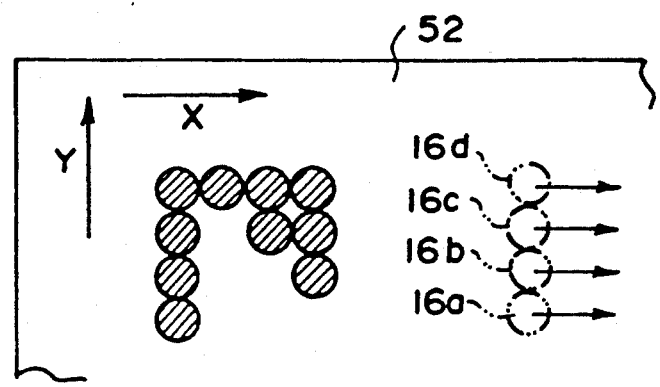
FIG. 14 is a fragmentary schematic view showing, by way of example, an image recorded on a photosensitive member by the recording device.

FIG. 14 shows an image recorded on the photosensitive member when the signals S1 through S4 have levels as shown at (1) through (4) in FIG. 7. Small circles, shown hatched, indicate dots which are recorded by exposure to the light beams 16a through 16d. Since the recording device 50 employs the light modulator 10 which can modulate a plurality of light beams simultaneously, the recording device 50 can record a plurality of lines at the same time.

The light deflector used in the recording device according to the present invention i not limited to the polygon mirror 51, but may be a galvanometer mirror, a hologram scanner, an electrooptic light deflector (EOD), an acoustooptic light deflector (AOD), or the like. The auxiliary scanning means is also not limited to the rotatable platen 53, but may be a means for feeding the recording medium in a plane, or a light modulator for deflecting the light beams.

Figure 15:
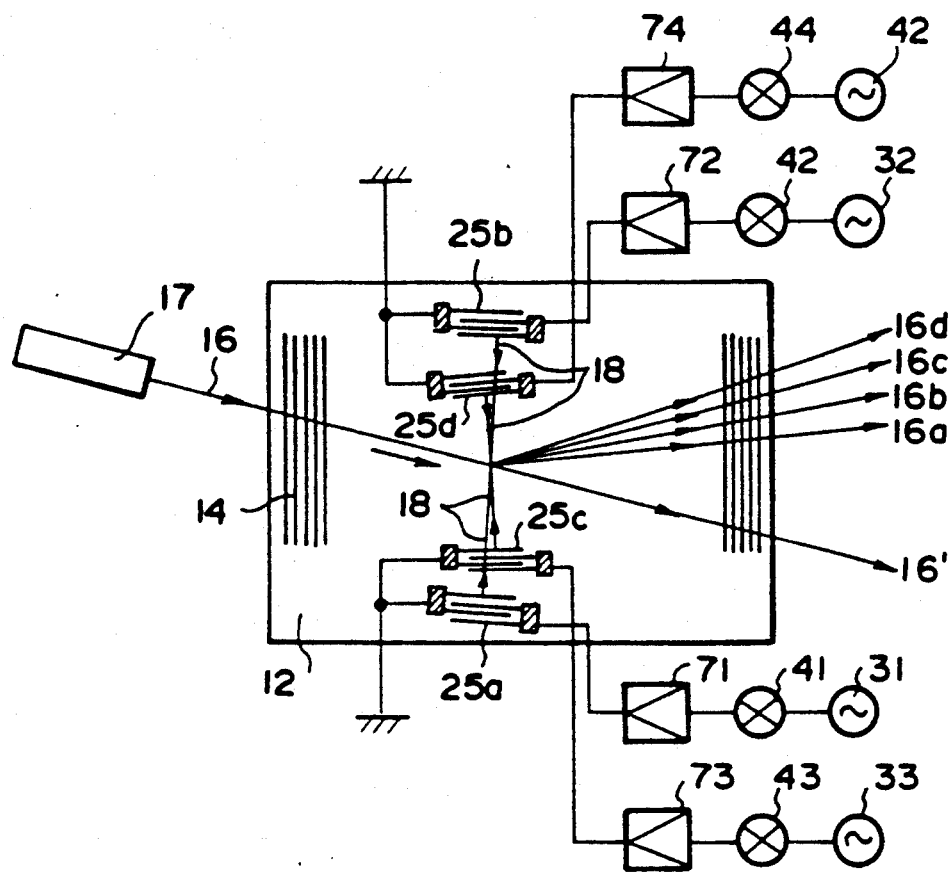
FIG. 15 is a schematic plan view of a light modulator according to still another embodiment of the present invention.
Figure 16:
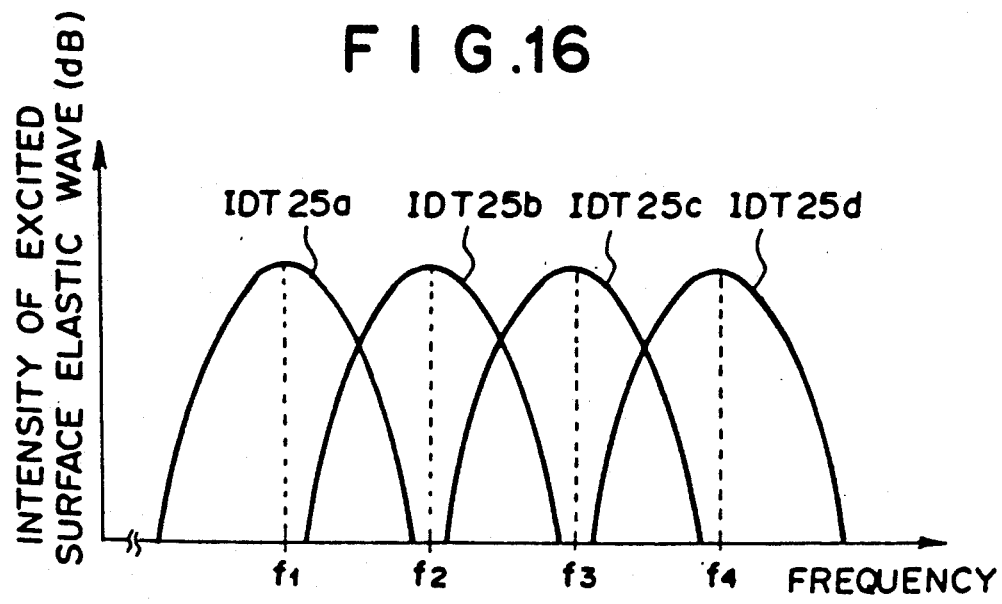
FIG. 16 is a graph showing surface elastic wave frequencies of a uniform interdigital transducer.

FIG. 15 is a light modulator according to still another embodiment of the present invention. The light modulator shown in FIG. 15 incorporates frequency-separated (uniform) IDTs 25a, 25b, 25c, 25d which are identical to those shown in FIG. 8. The uniform IDTs 25a through 25d excite surface elastic waves whose frequency bands are shown in FIG. 16. The surface elastic waves generated by these IDTs 25a through 26d have respective central frequencies $f_1$, $f_2$, $f_3$, $f_4$ ($f_1 < f_2 < f_3 < f_4$). High-frequency voltages having respective frequencies $f_1$, $f_2$, $f_3$, $f_4$ are applied to the respective IDTs 25a through 25d. Adjacent ones of the frequency bands of the produced surface elastic waves overlap each other.

The IDTs 25a, 25c are positioned on one side of the light beam 16, whereas the IDTs 25b, 25d are positioned on the other side of the light beam 16. Stated otherwise, the IDTs 25a through 25d, which produce surface elastic waves whose frequencies are progressively lower or higher, are successively arranged alternately on both sides of the light beam 16.

As shown in FIG. 16, the excited frequency bands of the adjacent IDTs 25a, 25c do not overlap each other, and similarly the excited frequency bands of the adjacent IDTs 25b, 25d do not overlap each other. Therefore, the surface elastic wave 18 of the frequency $f_1$ which is generated by the IDT 25a is not absorbed by the IDT 25c, and the surface elastic wave 18 of the frequency $f_2$ which is generated by the IDT 25b is not absorbed by the IDT 25d. Because the surface elastic waves 18 are thus prevented from being absorbed, any energy loss thereof is reduced, and the diffraction efficiency with which the light beam 16 is diffracted is maintained at a high level.

The IDT 25a may be located closer to the light beam 16 than the IDT 25c, and the IDT 25b may be located closer to the light beam 16 than the IDT 25d. In order to minimize the loss of the surface elastic waves 18, however, those IDTs which excite surface elastic waves 18 of higher frequencies should preferably be positioned closer to the light beam 16, as shown in FIG. 15.

A light modulator according to yet another embodiment of the present invention will hereinafter be described with reference to FIG. 17. The light modulator shown in FIG. 17 has two IDTs 25a, 25b for exciting surface elastic waves 18 having respective frequencies $f_1$, $f_2$, the IDTs 25a, 25b being disposed one on each side of the light beam 16.

The arrangement shown in FIG. 17 is also effective to prevent absorption of the surface elastic waves 18 which would otherwise be caused by overlapping frequency bands of the IDTs 25a, 25b. Inasmuch as only one IDT is positioned on each side of the light beam 16, the wave surface (phase) of the surface elastic wave generated by the IDT is not subject to disturbances which would otherwise occur upon propagation of the surface elastic wave below another IDT which would otherwise be present on the same side of the light beam, and the surface elastic wave does not suffer a loss which would otherwise be caused by being reflected by another IDT which would otherwise be present on the same side of the light beam.

Figure 18:
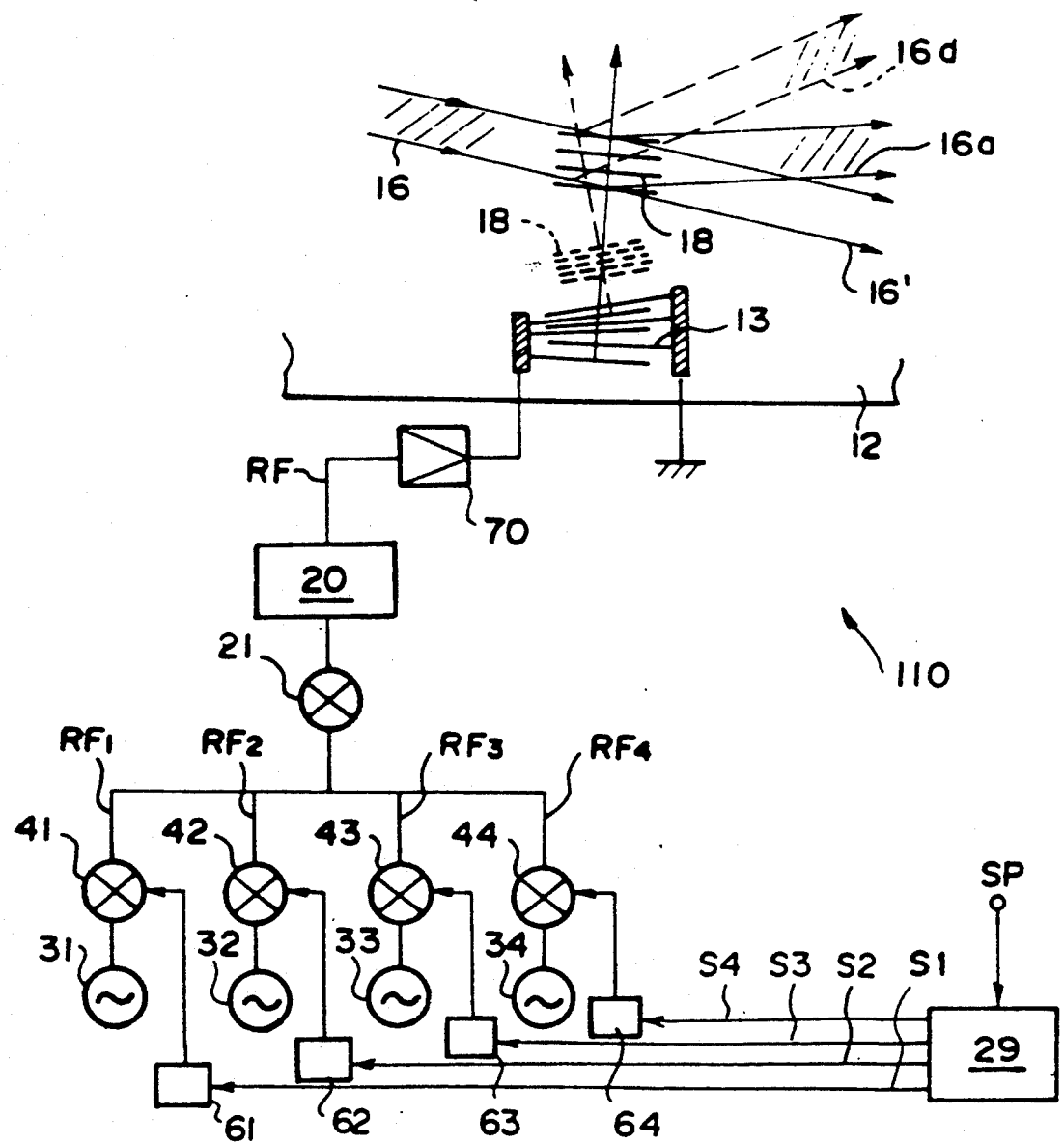
FIG. 18 is a schematic diagram showing a portion of a light modulator according to a further embodiment of the present invention and an electric circuit connected thereto.

FIG. 18 shows a light modulator according to a further embodiment of the present invention, the view illustrating a portion of the light modulator around an IDT and an electric circuit connected to the IDT.

The light modulator, generally denoted at 110, has switching circuits 41, 42, 43, 44 which can be opened and closed by modulating signals S1, S2, S3, S4 which are applied respectively thereto. Therefore, the application of the high-frequency voltages $RF_1$, $RF_2$, $RF_3$, $RF_4$ to a tilted-finger chirped IDT 13 can be turned on and off by these modulating signals S1, S2, S3, S4, respectively. As a result, the components of the surface elastic wave 18 which have the respective frequencies $f_1$, $f_2$, $f_3$, $f_4$ can be turned on and off, and hence the light beams 16a, 16b, 16c, 16d can be modulated or turned on and off by the respective modulating signals S1, S2, S3, S4. The modulating signals S1, S2, S3, S4 are supplied to the switching circuits 41, 42, 43, 44 through respectively delay circuits 61, 62, 63, 64.

Figure 19:
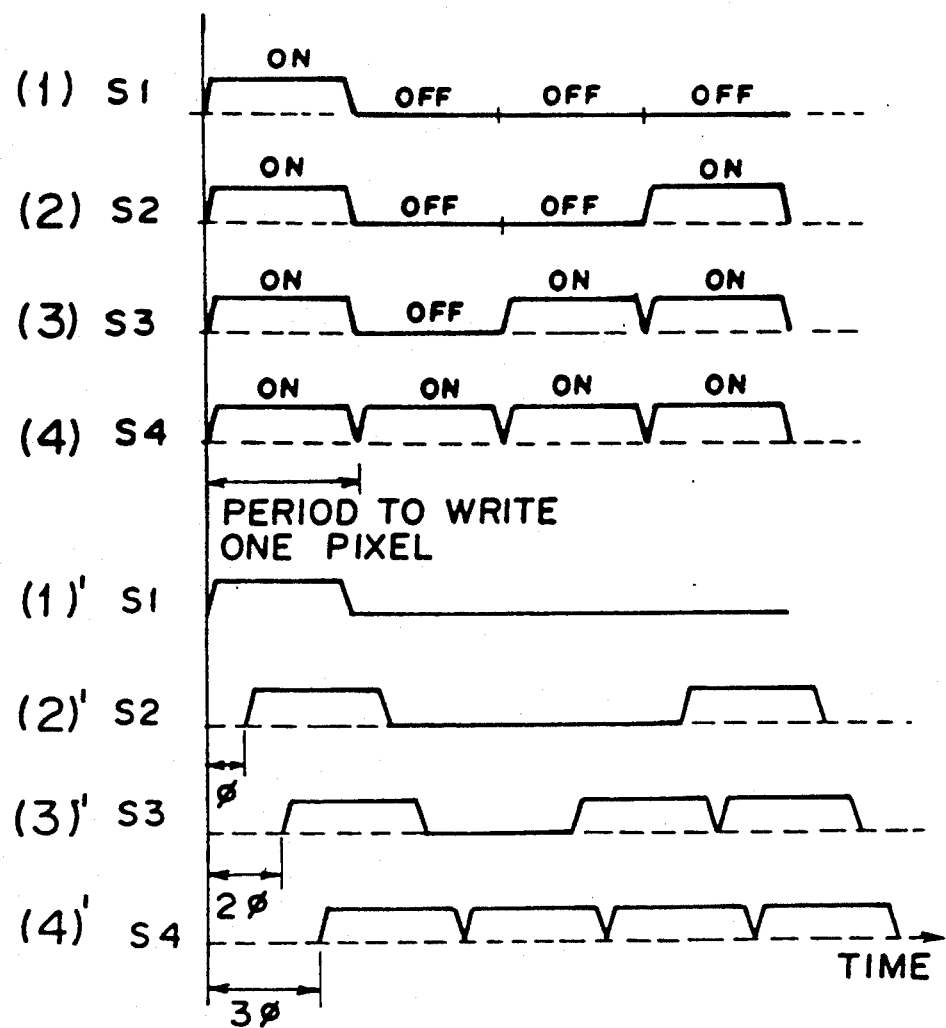
FIG. 19 is a graph illustrative of delays of ON-OFF control signals for surface elastic waves in the light modulator shown in FIG. 18.

Operation of the delay circuits 61, 62, 63, 64 is as follows: After the surface elastic wave having the respective frequencies $f_1$, $f_2$, $f_3$, $f_4$ have been excited by the electrode fingers, they reach the light beam 16 in respective times $t_1$, $t_2$, $t_3$, $t_4$ ($t_1 < t_2 < t_3 < t_4$). The delay circuits 61 through 64 serve to compensate for the differences between these times $t_1$ through $t_4$. In this embodiment, these time differences are $t_1 - t_2 = t_2 - t_3 = t_3 - t_4 = \phi$. The delay circuits 62, 63, 64 delay the respective signals S2, S3, S4 applied thereto by times $\phi$, $2\phi$, $3\phi$, respectively, and then apply the delays signals S2, S3, S4 to the respective switching circuits 42, 43, 44. The delay circuit 61 passes the signal S1 with no delay time, and applies the signal S1 to the switching circuit 41. The signals S1, S2, S3, S4 before they pass through the delay circuits 61 through 64 are shown at (1), (2), (3), (4), respectively, in FIG. 19, and the signals S1, S2, S3, S4 after they have passed through the delay circuits 61 through 64 are shown at (1)', (2)', (3)', (4)', respectively, in FIG. 19.

Figure 20:
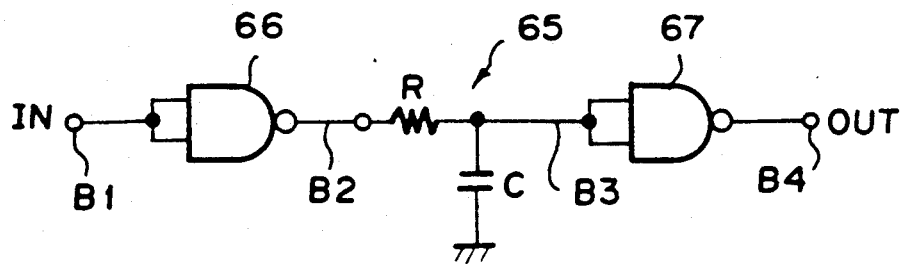
FIG. 20 is a circuit diagram of a delay circuit for delaying an ON-OFF control signal.
Figure 21:
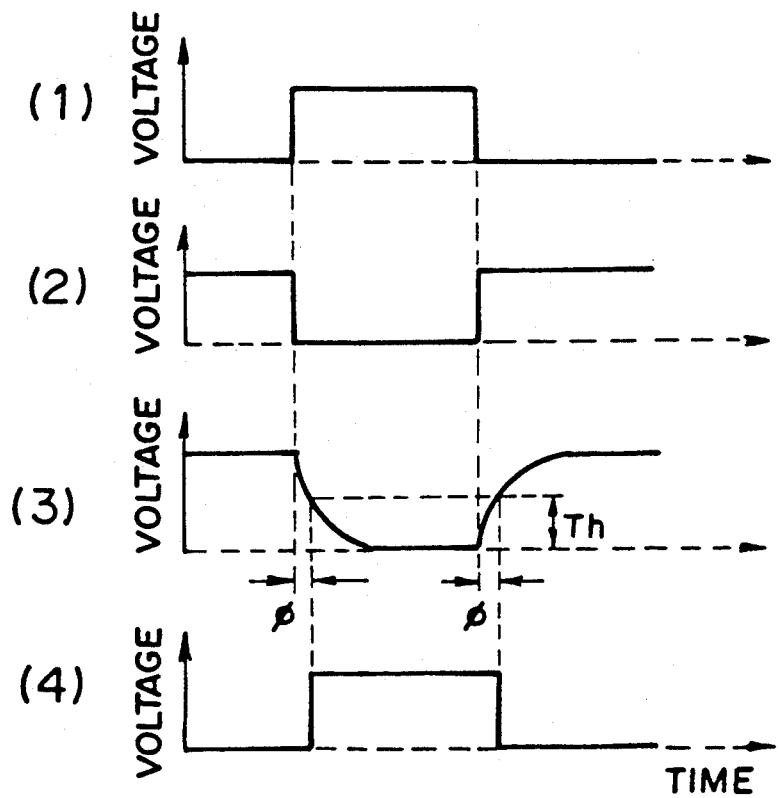
FIG. 21 is a diagram illustrative of operation of the delay circuit shown in FIG. 20.

Each of the delay circuits 61 through 64 may be composed of an RC circuit 65 and NAND gates 66, 67. When a rectangular-wave signal as shown at (1) in FIG. 21 is applied to a point B1, it is fed through the NAND gate 66, which sends an inverted rectangular-wave signal as shown at (2) in FIG. 21 to a point B2. The signal is then sent through the RC circuit 65 to a point B3 where the signal is distorted as shown at (3) in FIG. 21. This signal is then applied to the NAND gate 67. Since the signal level reaches a threshold level Th, which controls the output of the NAND gate 67, upon elapse of the time $\phi$ after the negative- or positive-going edge of the rectangular-wave signal at the point B2, the NAND gate 67 produces a rectangular-wave signal at a point B4 which lags behind the rectangular-wave signal at the point B1. With $R = 100 \Omega$ and $C = 100$ pF in the circuit arrangement shown in FIG. 20, a time delay of 10 nsec. is obtained.

When the signals S2, S3, S4 are delayed by the respective times $\phi$, $2\phi$, $3\phi$, the signals S1 through S4 are applied to the switching circuits 41 through 44 at the same timing, so that the diffracted light beams 16a through 16d are modulated at the same timing.

Figure 13:
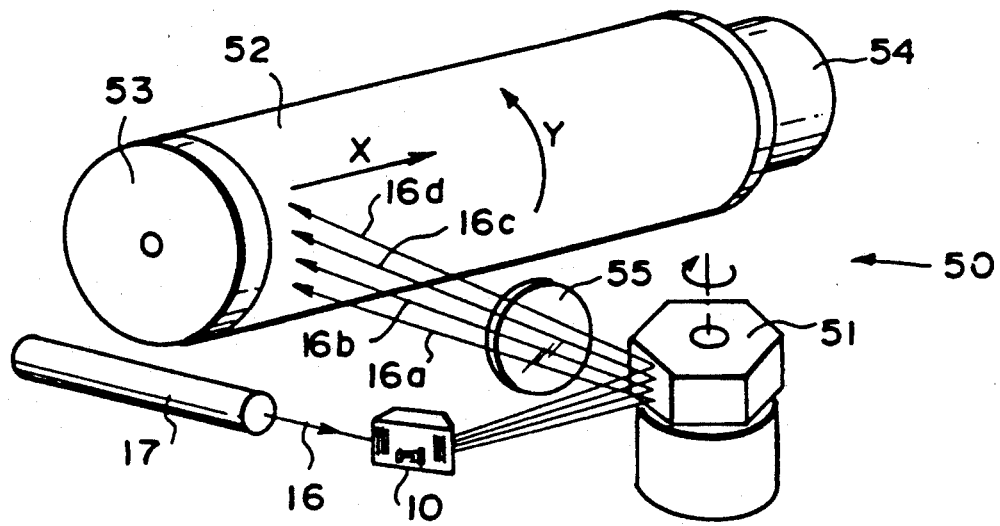
FIG. 13 is a schematic perspective view of a recording device according to an embodiment of the present invention.

In the case where the light modulator 110 is incorporated in the recording device shown in FIG. 13, the diffracted light beams 16a through 16d are modulated at the same timing through the action of the delay circuits 61 through 64. When some of the signals S1 through S4 which are simultaneously applied to the corresponding switching circuits, images which are represented by those signals are recorded on the photosensitive member at a common position in the main scanning direction. For example, if all the signals S1 through S4 are ON signals at a certain time, then four dots, which are arrayed in the auxiliary scanning direction Y, are recorded on the photosensitive member at a common position in the main scanning direction X.

If the signals were not delayed as described above, then an image composed of four dots represented by the ON signals S1 through S4 at a certain time would not be recorded as a linear image along the auxiliary scanning direction Y, but would be distorted in the main scanning direction X.

Figure 22:
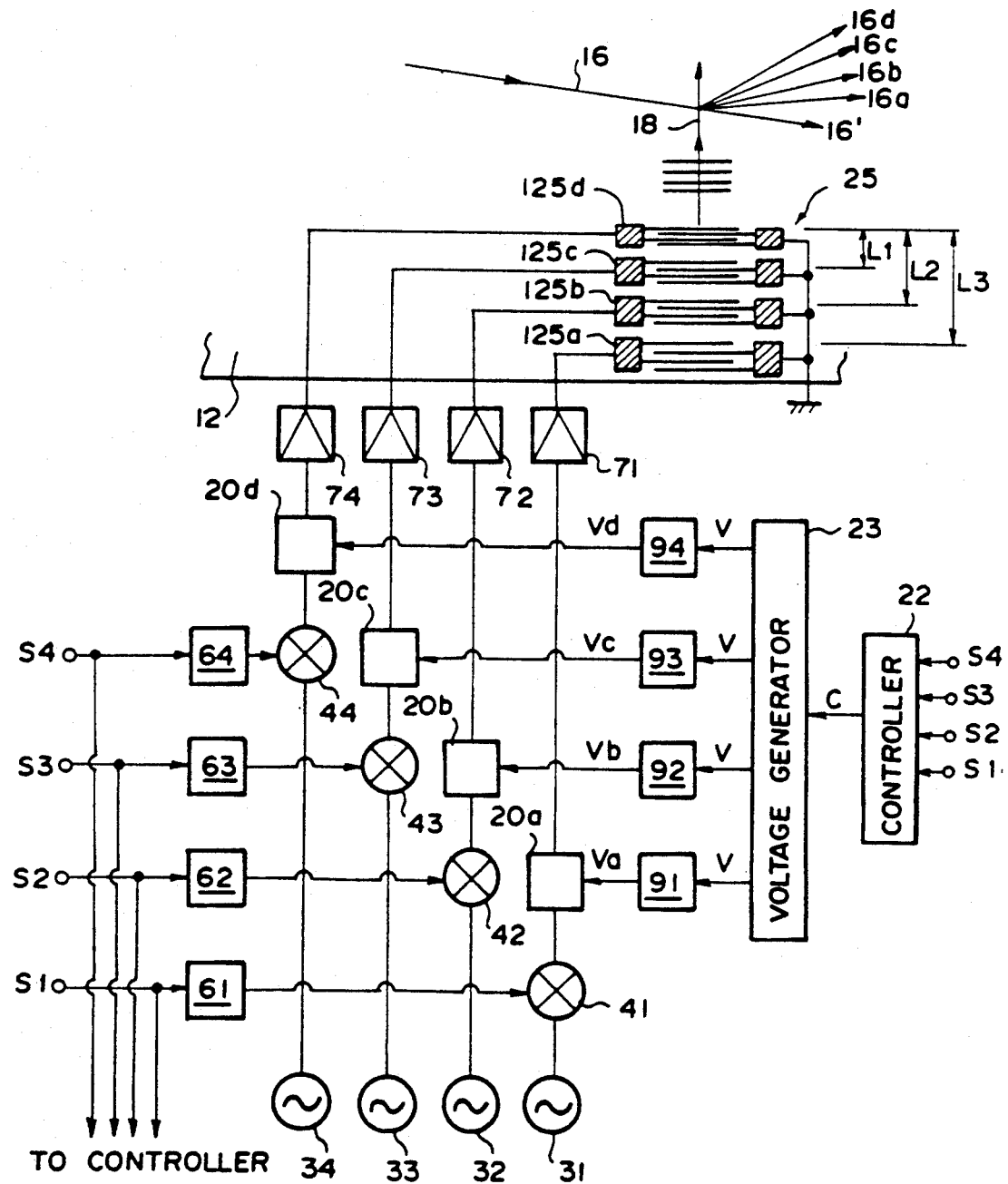
FIG. 22 is a circuit diagram of an electric circuit of a light modulator according to a still further embodiment of the present invention.

FIG. 22 shows a light modulator according to a still further embodiment of the present invention, the light modulator having an electric circuit for keeping the intensities of the diffracted light beams 16a through 16d at a constant level irrespective of how they may be modulated.

The light modulator shown in FIG. 22 includes a frequency-separated IDT 125 which comprises small IDTs 125a, 125b, 125c, 125d having electrode fingers spaced at different intervals, the IDTs 125a, 125b, 125c, 125d being dedicated to particular frequencies. The IDTs 125a, 125b, 125c, 125d are differently directed such that surface elastic waves 18 generated respectively from the IDTs 125a, 125b, 125c, 125d and having respective frequencies $f_1$, $f_2$, $f_3$, $f_4$ ($f_1 < f_2 < f_3 < f_4$) diffract a light beam 16 in a substantially single location on the light path of the light beam 16 while satisfying the Bragg condition for diffraction. In each of the IDTs 125a through 126d, the electrode fingers are spaced at a constant interval. While the IDTs 125a through 125d are shown as being oriented in the same direction, they are actually oriented in different directions as with the electrode fingers of the IDT 13 shown in FIG. 18, such that the Bragg condition will be satisfied between the surface elastic waves 18 of the respective frequencies and the light beam 16. It takes the times $\phi$, $2\phi$, $3\phi$ for the surface elastic waves 18 to be propagated over distances indicated by L1, L2, L3, respectively. To the IDTs 125a, 125b, 125c, 125d, there are connected RF amplifiers 71, 72, 73, 74, attenuators 20a, 20b, 20c, 20d, switching circuits 41, 42, 43, 44, and high-frequency oscillators 31, 32, 33, 34, respectively.

Figure 23:
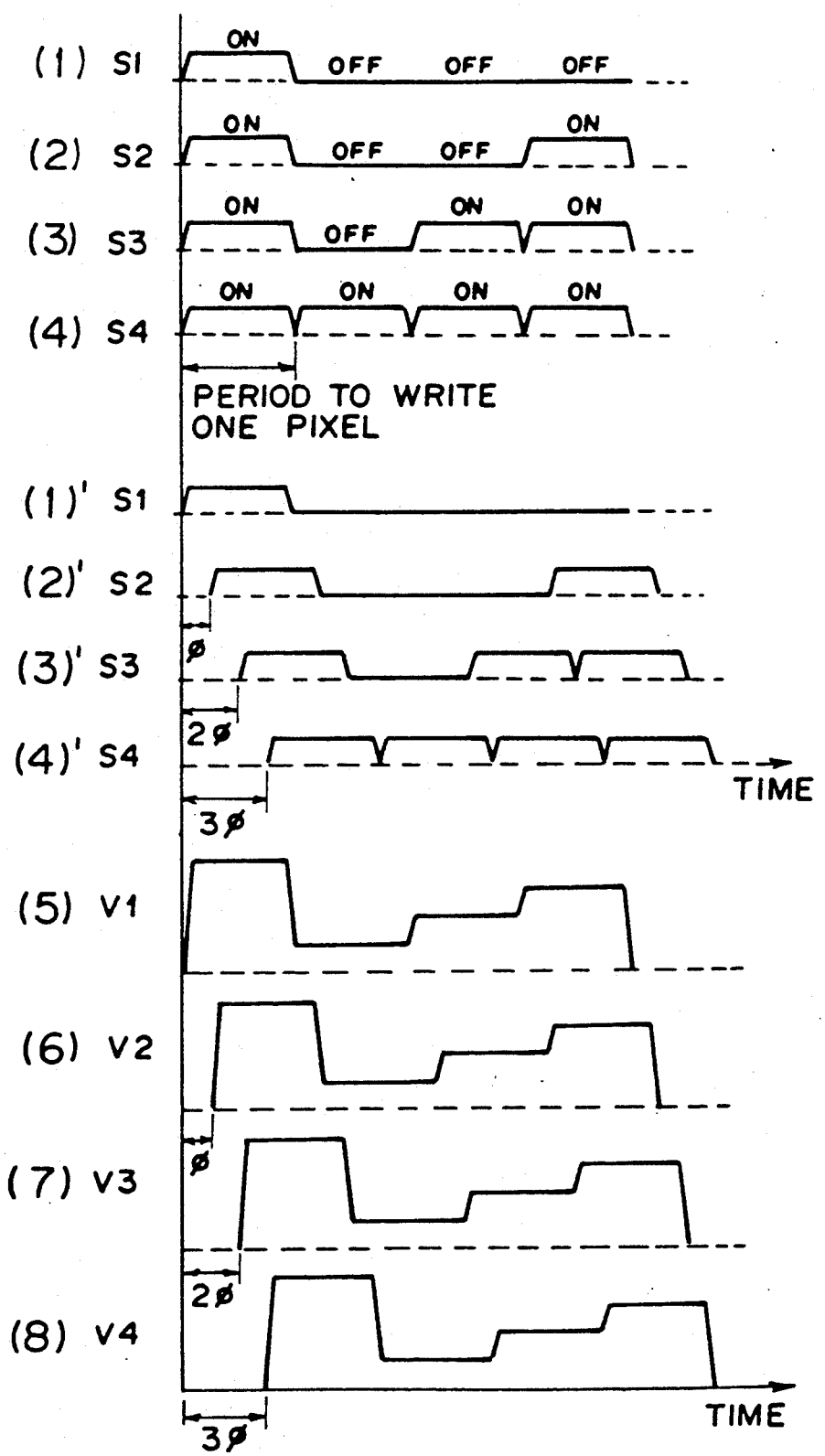
FIG. 23 is a graph showing the relationship between modulating signals, delay signals therefor, and attenuator control voltages in the light modulator shown in FIG. 22.

In the circuit arrangement shown in FIG. 22, the signals S1 through S4 are delayed by the delay circuits 61 through 64, respectively, by the same time delays as those in the circuit arrangement shown in FIG. 18, as shown at (1) through (4) and (1)' through (4)' in FIG. 23. Therefore, the diffracted light beams 16a through 16d are modulated at the same timing.

To compensate for the variations of the diffraction efficiency, the modulating signals S1 through S4 are supplied to the controller 22 as well as the switching circuits 41 through 44, as shown in FIG. 22. The controller 22 determines how many command signals which instruct the switching circuits 41 through 44 to be closed (i.e., to turn the high-frequency voltages $RF_1$ through RF$_4$) are contained in the modulating signals S1 through S4 at each time, and generates a signal C which can have four levels dependent on the determined number of signals. The signal C is then applied to the voltage generator 23, which produces a control voltage V whose level is variable between four levels, as shown at (5) in FIG. 23. Therefore, the level of the output voltage V of the voltage generator 23 varies depending on the number of command signals which turn on the high-frequency voltages RF$_1$ through RF$_4$. More specifically, if one of the high-frequency voltages RF$_1$ through RF$_4$ is to be turned on, then a control voltage V of a minimum level V$_1$ is produced by the voltage generator 23. If two, three, or four high-frequency voltages are to be turned on, then a control voltage V having a level V$_2$, V$_3$, or V$_4$ is produced by the voltage generator 23. The control voltage V is then applied to attenuators 20a, 20b, 20c, 20d through respective delay circuits 91, 92, 93, 94. Each of the attenuators 20a through 20d is constructed such that as the applied control voltage V is higher, the attenuator lowers its attenuator factor. The level of the high-frequency voltage RF which has passed through the attenuators 20a through 20d is therefore controlled to have one of four levels at a time, depending on the number of command signals which turn on the high-frequency voltages RF$_1$ through RF$_4$.

The control voltage V is delayed by the delay circuits 91 through 94 in the same manner as the signals S1 through S4 are delayed by the respective delay circuits 61 through 64. Specifically, the delay circuit 91 passes the control voltage V as a control voltage Va with no delay time, and the delay circuits 92 through 94 pass the control voltage V as control voltages Vb, Vc, Vd with respective delay times $\phi$, $2\phi$, $3\phi$. The timing for modulating the diffracted light beams is therefore equalized to the timing to compensate for variations in the intensities of the diffracted light beams. The levels of the control voltages shown at (5) through (8) in FIG. 23 are shown as corresponding to the levels of the modulating signals S1 through S4 shown at (1) through (4) in FIG. 23.

With the levels of the high-frequency voltages RF$_1$ through RF$_4$ being thus controlled, the light beam 16 is diffracted by the surface elastic wave 18 of higher power as the number n of diffracted light beams is greater. Therefore, the intensities of the diffracted light beams 16a through 16d are kept at a substantially constant level irrespective of the number n of diffracted light beams.

Variations in the intensities of the diffracted light beams 16a through 16d may be compensated for by controlling operation of the high-frequency oscillators 31 through 34 thereby to vary the levels of the high-frequency voltages RF$_1$, RF$_2$, RF$_3$, RF$_4$, rather than varying the attenuation factor of the attenuator 20.

In the first light modulator according to the present invention, the electrode fingers of the IDT are directed such that the Bragg condition for diffraction will be satisfied between the surface elastic waves generated by the electrode fingers and the light beam. Therefore, the diffraction efficiency with which the light beam is diffracted by the surface elastic waves of respective frequencies is kept at a sufficiently high level, and at the same time the surface elastic waves have a wide frequency band. The light modulator thus maintains a high speed of modulation and can divide the light beam into many light beams.

Since the light beam guided through the optical waveguide is modulated by the first light modulator, the light beam is highly confined in the optical waveguide. Moreover, all the powers of the surface elastic waves of respective frequencies contribute to the diffraction of the light beam. As a consequence, the diffraction efficiency is increased.

In the second light modulator according to the present invention, the signals for turning on and off the surface elastic waves are passed through the respective delay circuits to compensate for the differences between the times required for the surface elastic waves of respective frequencies, after being generated by the IDT, to reach the light beam. Accordingly, the timing to modulate the diffracted light beams is equalized with the timing at which the signals to turn on and off the surface elastic waves are applied. When an image is to be recorded with a plurality of modulated light beams, since the timings at which the light beams are modulated are equalized, the image can be recorded accurately without distortions.

The recording device according to the present invention incorporates a light modulator which can modulate a plurality of light beams simultaneously. Therefore, the recording device can record a number of lines at the same time. Since the diffraction efficiency with which the light beams are diffracted is high, the intensities of the recording light beams can be maintained at a high level. Consequently, the recording device of the present invention can record information at high speed.

Although certain preferred embodiments have been shown and described, it should be understood that many changes and modifications may be made therein without departing from the scope of the appended claims.

We claim:
1. A light modulator comprising:
 i) an optical waveguide made of a material capable of propagating surface elastic waves;
 ii) an interdigital transducer having a plurality of interdigital electrode fingers for generating surface elastic waves having respective different frequencies in said optical waveguide, said electrode fingers being oriented in different directions to enable said generated surface elastic waves to diffract a light beam guided through said optical waveguide, while satisfying the Bragg condition for diffraction;
 iii) a driver for simultaneously applying high-frequency voltages having said different frequencies to said electrode fingers to generate said surface elastic waves, respectively, where said light beam is separated into a plurality of output beams corresponding to each of said different frequencies; and
 iv) switching means for turning on and off the application of said high-frequency voltages to said electrode fingers.

2. A light modulator according to claim 1, wherein said electrode fingers are independently provided for generating said surface elastic waves, respectively, and wherein said electrode fingers which generate said surface elastic waves having respective different frequencies of successive magnitudes are successively arranged alternately on both sides of said optical waveguide.

3. A light modulator comprising:
 i) an optical waveguide made of a material capable of propagating surface elastic waves;

ii) an interdigital transducer having a plurality of interdigital electrode fingers for generating surface elastic waves having respective different frequencies in said optical waveguide, said electrode fingers being arranged to enable the generated surface elastic waves to diffract a light beam guided through said optical waveguide;

iii) a driver for applying high-frequency voltages having respective frequencies to said electrode fingers to generate said surface elastic waves, respectively;

iv) switching means for turning on and off the application of said high-frequency voltages to said electrode fingers; and v) delay circuits for receiving control signals which control operation of said switching means before said control signals are applied to said switching means, for delaying said control signals by times corresponding to distances between the electrode fingers connected to said switching means and a location where the light beam is diffracted by the surface elastic waves, thereby to substantially equalize times required for the surface elastic waves to reach said location after the control signals are applied to said delay circuits.

4. A recording device comprising:

i) an optical waveguide made of a material capable of propagating surface elastic waves;

ii) an interdigital transducer having a plurality of interdigital electrode fingers for generating surface elastic waves having respective different frequencies in said optical waveguide, said electrode fingers being arranged to enable said generated surface elastic waves to diffract a light beam guided through said optical waveguide;

iii) a driver for simultaneously applying high-frequency voltages having said different frequencies to said electrode fingers to generate said surface elastic waves, respectively, where said light beam is separated into a plurality of output beams corresponding to each of said different frequencies;

iv) switching means for turning on and off the application of said high-frequency voltages to said electrode fingers;

v) a recording light source for generating the light beam to be introduced into said optical waveguide;

vi) a light deflector for deflecting a plurality of diffracted light beams emitted in different directions out of said optical waveguide, so as to scan a recording medium in a main scanning direction across a direction in which said diffracted light beams are arrayed;

vii) auxiliary scanning means for scanning said diffracted light beams on said recording medium in an auxiliary scanning direction which is substantially perpendicular to said main scanning direction; and viii) a modulation control circuit for controlling operation of said switching means based on a recording signal.

* * * * *